United States Patent
Amir et al.

(10) Patent No.: US 11,256,535 B2
(45) Date of Patent: Feb. 22, 2022

(54) VISUALIZATIONS OF COMPUTER PROGRAM TRANSACTIONS

(71) Applicant: ENTIT SOFTWARE LLC, Sanford, NC (US)

(72) Inventors: Jonatan Amir, Yehud (IL); Ronit Landsman, Yehud (IL); Yoram Kohane, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 429 days.

(21) Appl. No.: 15/999,111

(22) PCT Filed: Feb. 18, 2016

(86) PCT No.: PCT/US2016/018382
§ 371 (c)(1),
(2) Date: Aug. 17, 2018

(87) PCT Pub. No.: WO2017/142535
PCT Pub. Date: Aug. 24, 2017

(65) Prior Publication Data
US 2020/0356404 A1 Nov. 12, 2020

(51) Int. Cl.
*G06F 9/46* (2006.01)
*G06F 16/901* (2019.01)
*G06F 9/54* (2006.01)

(52) U.S. Cl.
CPC ............ *G06F 9/466* (2013.01); *G06F 9/542* (2013.01); *G06F 9/546* (2013.01); *G06F 16/9024* (2019.01)

(58) Field of Classification Search
CPC ...... G06F 9/466; G06F 16/9024; G06F 9/542; G06F 9/546
See application file for complete search history.

(56) References Cited

U.S. PATENT DOCUMENTS

| | | | | |
|---|---|---|---|---|
| 5,794,047 A | * | 8/1998 | Meier | G06F 9/547 709/203 |
| 6,014,514 A | * | 1/2000 | Sistare | G06F 11/323 714/E11.181 |

(Continued)

OTHER PUBLICATIONS

International Search Report & Written Opinion received in PCT Application No. PCT/US2016/018382, dated Nov. 16, 2016, 15 pages.

(Continued)

*Primary Examiner* — Adam Lee

(57) ABSTRACT

Examples disclosed herein relate to visualizations of computer program transactions. The examples enable obtaining a transaction record of a computer program. The transaction record may include a call stack of a plurality of procedure calls and a self-time of each procedure call. The examples enable generating a graphical representation of the transaction record having a plurality of two-dimensional shapes aligned with a first axis and a second axis. Each two-dimensional shape represents a procedure call, and a first dimension of each shape represents a call-time of each procedure call while a second dimension of each shape represents the self-time of each procedure call. The shapes are positioned in the graphical representation to reflect relative positions within the call stack.

11 Claims, 7 Drawing Sheets

(56) References Cited

U.S. PATENT DOCUMENTS

| | | | |
|---|---|---|---|
| 6,282,701 B1 | 8/2001 | Wygodny et al. | |
| 7,995,062 B2 | 8/2011 | Zhang | |
| 8,438,427 B2 | 5/2013 | Beck et al. | |
| 9,146,836 B2 | 9/2015 | Rapp et al. | |
| 2004/0075690 A1* | 4/2004 | Cirne | G06F 11/323 715/771 |
| 2008/0209406 A1* | 8/2008 | O'Callahan | G06F 11/3476 717/131 |
| 2010/0235815 A1* | 9/2010 | Maybee | G06F 11/3636 717/125 |
| 2012/0137273 A1 | 5/2012 | Meijler et al. | |
| 2012/0260236 A1 | 10/2012 | Basak et al. | |
| 2014/0282418 A1 | 9/2014 | Wood et al. | |
| 2015/0293761 A1* | 10/2015 | Rabin | G06F 8/77 717/120 |

OTHER PUBLICATIONS

Karam, G., Visualization Using Timelines, ResearchGate, Jan. 1994, 2 pages.

Trumper, J. et al. "Understanding Complex Multithreaded Software Systems By Using Trace Visualization," Proceedings of the 5th International Symposium on Software Visualization, ACM, 2010, 10 pages, available at https://www.cs.swarthmore.edu/~bylvisa1/cs97/f13/Papers/p133-trumper.pdf.

Diehl, S. et al., "Multivariate Graphs in Software Engineering," (Research Paper), Feb. 18, 2014, 23 pages, available at http://citeseerx.ist.psu.edu/viewdoc/download?doi=10.1.1.708.4465&rep=rep1&type=pdf.

Trumper, J. et al., "Multiscale Visual Comparison of Execution Traces," 2013 21st International Conference on Program Comprehension (ICPC), IEEE, 2013, 3 pages, available at http://ieeexplore.ieee.org/document/6613833/.

\* cited by examiner

VISUALIZATIONS OF COMPUTER PROGRAM TRANSACTIONS

BACKGROUND

Computer programs produce many information records about a program's execution, including procedure call stacks, procedure call-times, events and exceptions, as well as log entries and performance metrics. A visualization of the information records may provide the information in a digestible manner to users such as software performance engineers.

BRIEF DESCRIPTION OF THE DRAWINGS

The following detailed description references the drawings, wherein.

DETAILED DESCRIPTION

Computer programs produce many information records about a program's execution, including procedure call stacks, procedure call-times, events and exceptions, as well as log entries and performance metrics. A visualization of the information records may provide the information in a digestible manner to users such as software performance engineers.

With the increased complexity of computer programs, many programs may create a vast amount of data. This vast amount of program transaction data may present too much information for some customers to digest or even for some manufacturers, suppliers, distributers or other related parties of the item to view and analyze in a meaningful way.

Examples disclosed herein provide a tool that visualizes various aspects of computer program transactions. The examples disclosed herein enable obtaining a transaction record of a computer program. The transaction record may include a call stack of a plurality of procedure calls and a self-time of each procedure call. The examples enable generating a graphical representation of the transaction record having a plurality of two-dimensional shapes aligned with a first axis and a second axis. Each two-dimensional shape represents a procedure call, and a first dimension of each shape represents a call-time of each procedure call while a second dimension of each shape represents the self-time of each procedure call. The shapes are positioned in the graphical representation to reflect relative positions within the call stack. In this manner, examples may provide various program transaction data without overwhelming a user.

Figure 1:
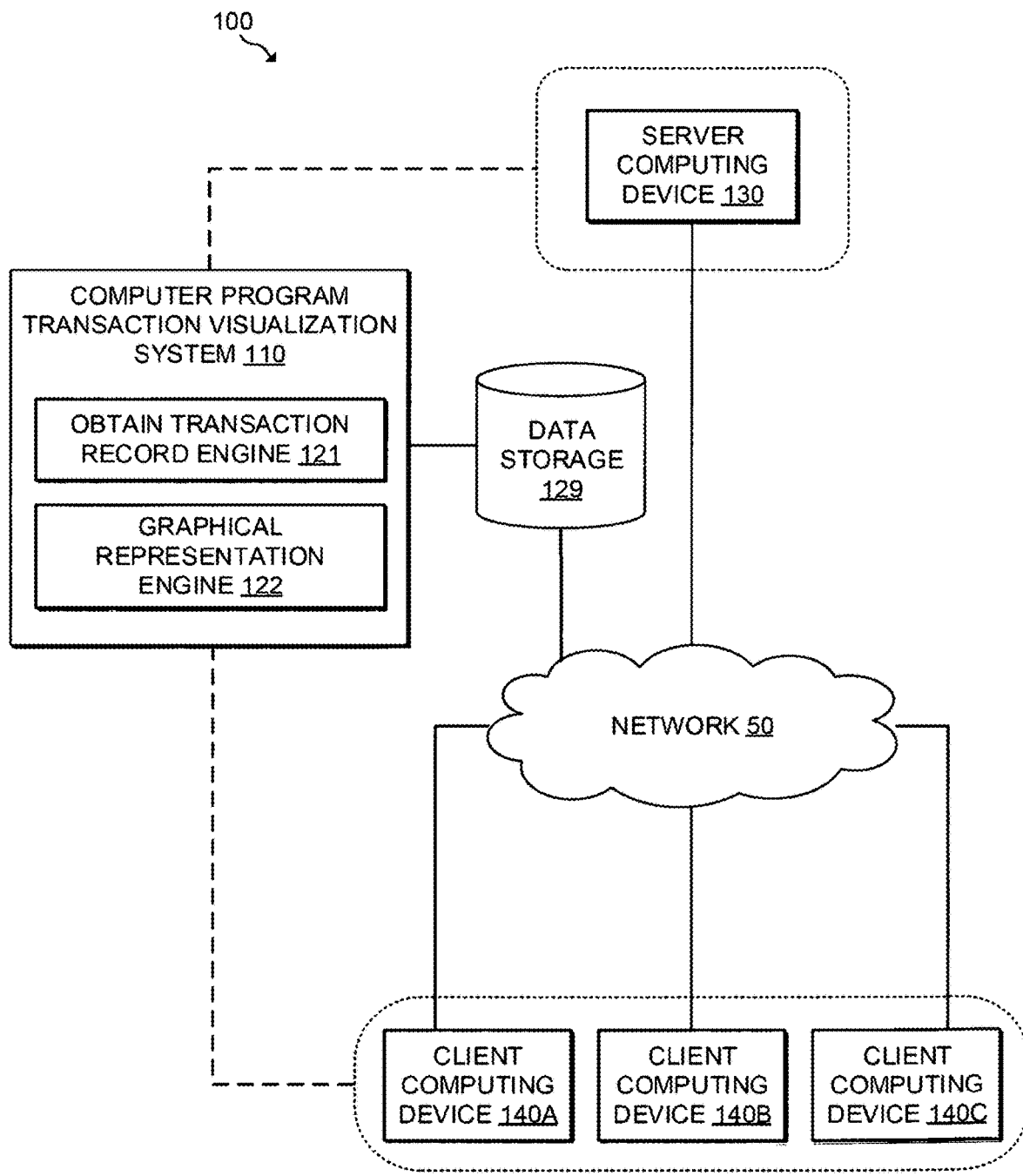
FIG. 1 is a block diagram depicting an example environment in which various examples may be implemented as a system for visualizations of computer program transactions.

Referring now to the drawings, FIG. 1 is an example environment 100 in which various examples may be implemented as a computer program transaction visualizations system 110. Environment 100 may include various components including server computing device 130 and client computing devices 140 (illustrated as 140A, 140B . . . 140N). Each client computing device 140A, 140B . . . 140N may communicate requests to or receive responses from server computing device 130. Server computing device 130 may receive or respond to requests from client computing devices 140. Client computing devices 140 may be any type of computing device providing a user interface through which a user can interact with a software application. For example, client computing devices 140 may include a laptop computing device, a desktop computing device, an all-in-one computing device, a tablet computing device, a mobile phone, an electronic book reader, a network-enabled appliance such as a "Smart" television, and/or other electronic device suitable for displaying a user interface and processing user interactions with the displayed interface. While server computing device 130 is depicted as a single computing device, server computing device 130 may include any number of integrated or distributed computing devices serving at least one software application for consumption by client computing devices 140.

The various components (e.g., components 129, 130, or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. According to various implementations, system 110 and the various components described herein may be implemented in hardware and/or a combination of hardware and programming that configures hardware. Furthermore, in FIG. 1 and other Figures described herein, different numbers of components or entities than depicted may be used.

Computer program transaction visualizations system 110 may comprise an obtain transaction record engine 121 and graphical representation engine 122. In some examples, computer program transaction visualizations system 110 may include additional or alternative engines. The term "engine", as used herein, may refer to a combination of hardware and programming that performs a designated function. For example, the hardware of each engine, for example, may include one or both of a processor and a machine-readable storage medium, while the programming is instructions or code stored on the machine-readable storage medium and executable by the processor to perform the designated function. In addition or as an alternative, each engine may include one or more hardware devices including electronic circuitry for implementing the functionality described below.

Obtain transaction record engine 121 may obtain a transaction record of a computer program. The transaction record may include a call stack of a plurality of procedure calls and a self-time of each procedure call of the plurality of procedure calls. The computer program may refer to any computer application or collection of instructions executable by a computer.

A transaction record may be data associated with the execution of a transaction. A transaction may be an operation of a computer program. Each transaction may include a plurality of procedures, which may be a section of a computer program that performs a specific task. Procedure may be used interchangeably with routine, subroutine, and function. In some examples, a computer program may be a single thread application, which may generate a single trail of procedures for a transaction record of a transaction of the program.

A transaction record may include a call stack of a plurality of procedures. A call stack may be a stack data structure that stores information about the procedures of a computer program. Call stack may be used interchangeably with execution stack, control stack, call-time stack, or machine-stack. A call stack may be used for various related purposes, but a primary purpose of a call stack is to track the start and finish of procedures as well as the call-times of procedures. For example, procedures of a transactions may be nested in a stack structure, where a parent procedure higher in the stack may call upon execution of a child procedure. If, for example, a procedure "DrawSquare" calls upon a procedure "DrawLine" from four different places, the call stack of this transaction maintains where "DrawLine" is to return when its execution is completed.

A transaction record may include a self-time of each procedure call of a plurality of procedure calls. Self-time may be a duration during which a particular procedure is the active procedure—that is when the particular procedure has been called but is yet to complete execution and there is not execution of any child procedures (procedures branched from the particular procedure on the call stack). Self-time of a procedure may be expressed either as absolute time in time units or relative time to other procedures or both.

In some examples, the transaction record may further include an event indicator. An event indicator may indicate a particular procedure call that caused the event. Furthermore, an event indicator may indicate a particular point in a call-time of the particular procedure call when the event occurred. The time indicated by the event indicator may be absolute time or a relative runtime in relation to the execution of the transaction. Example events may include exceptions, faults, anomalies, log entries, or user-defined events such as when a particular metric meets a threshold. As an example, an event may be triggered when computing resources reach a certain limit or when a bug is detected in the procedure.

Graphical representation engine 122 may generate a graphical representation of a transaction record. For example, a graphical representation of a transaction record may be displayed via a user interface on a client computing device (e.g., client computing device 140A. Example user interfaces for displaying a graphical representation of a transaction record are illustrated in FIGS. 5-8.

Figure 5:
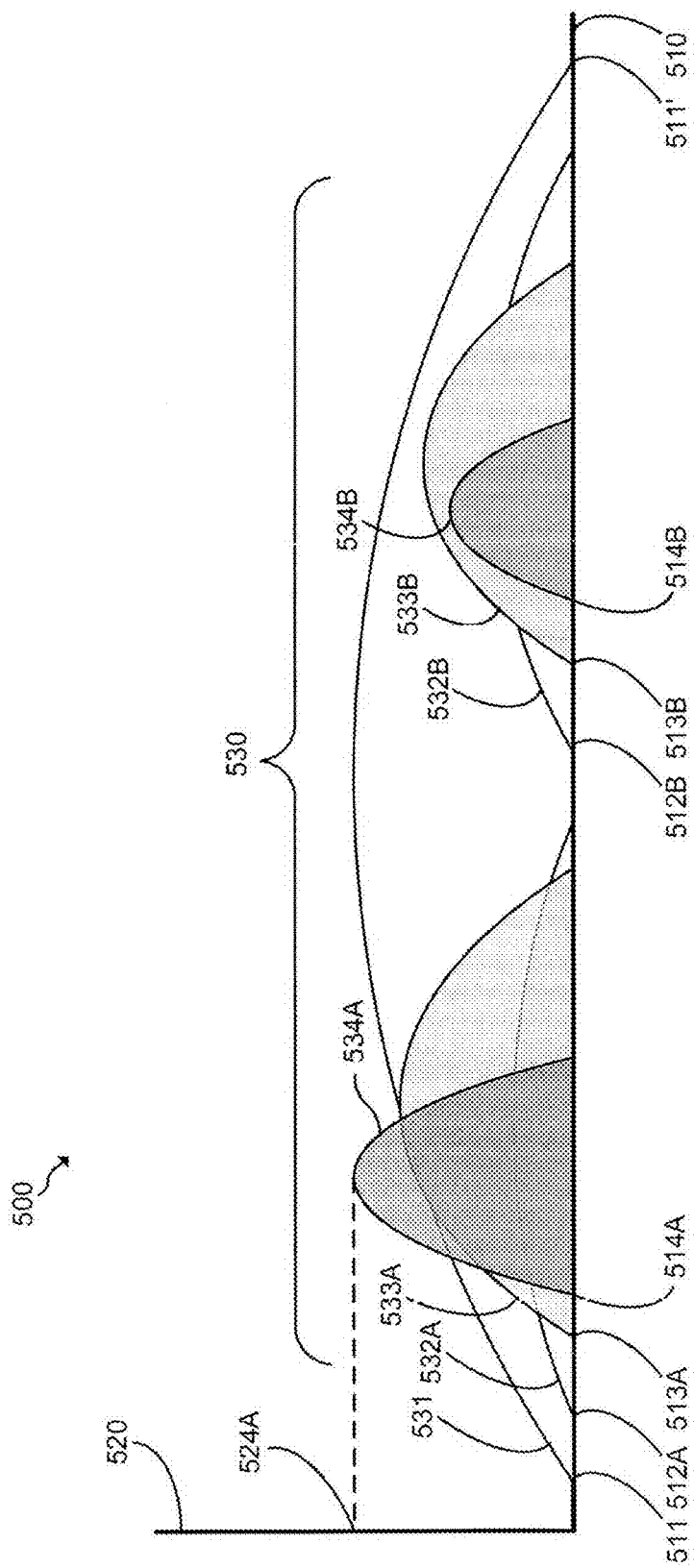
FIG. 5 is a schematic diagram depicting an example graphical representation for visualizations of computer program transactions.

A graphical representation of a transaction record may include a plurality of two-dimensional shapes. The plurality of two-dimensional shapes is illustrated in graphical representation 500 of FIG. 5 as plurality of elliptical arcs 530, which are also illustrated in graphical representations 600, 700, and 800 of FIGS. 6, 7, and 8, respectively. The plurality of two-dimensional shapes may be aligned with a first axis and a second axis. In the example of FIG. 5, elliptical arcs 530 may be aligned with a horizontal axis 510 and with a vertical axis 520.

Each two-dimensional shape may represent a procedure call of a plurality of procedure calls in a transaction record. For example, in FIG. 5, a first elliptical arc 531 may represent a first procedure call of a first function, second elliptical arc 532A may represent a first procedure call of a second function, third elliptical arc 533A may represent a first procedure call of a third function, fourth elliptical arc 534A may represent a first procedure call of a fourth function, fifth elliptical arc 532B may represent a second procedure call of a second function, sixth elliptical arc 533B may represent a second procedure call of a third function, and seventh elliptical arc 534B may represent a second procedure call of a fourth function.

Each two-dimensional shape representing a procedure call may have a first dimension that represents a call-time of each procedure call. For example, in the example of FIG. 5, each elliptical arc 530 may have a flat edge aligned with the horizontal axis, where a left edge of an elliptical arc represents a start of a respective procedure and a right edge of the elliptical arc represents an end of the respective procedure. The length of the horizontal axis occupied by a flat edge of a particular elliptical arc 530 may represent the call-time of the procedure call represented by the particular elliptical arc.

For example, a first procedure call represented by a first elliptical arc 531 may begin execution at point 511 of the horizontal call-time axis. The first procedure call may terminate at point 511', and the time in between the two points may be the call-time of the first procedure call. For further examples, the begin execution points of the procedure calls represented by elliptical arc 532A, 533A, 534A, 532B, 533B, and 534B are represented by points 512A, 513A, 514A, 512B, 513B, and 514B, respectively. The termination points of these procedure calls are omitted from FIG. 5 for simplicity.

Furthermore, each two-dimensional shape representing a procedure call may have a second dimension that represents a self-time of each procedure call. For example, in the example of FIG. 5, each elliptical arc 530 may have height in relation to the vertical axis 520 that represents the self-time of each procedure call. As explained previously, self-time may be a duration during which a particular procedure is the active procedure—that is when there is not execution of any child procedures. For example, a self-time of the procedure call represented by elliptical arc 534A is indicated by point 524A on the vertical axis 520. For elliptical arc 534A, the self-time is the same as the call-time because there is no execution of a child procedure. In contrast, the self-time for the procedure call represented by elliptical arc 533A would equal the call-time represented by arc 533*A minus* the call-time represented by arc 534A. The heights of the elliptical arcs 530 may thus indicate the relative self-times of each procedure call of the transaction.

Moreover, a plurality of two-dimensional shapes may be positioned within a graphical representation to reflect relative positions within a call stack. For instance, for the example of FIG. 5, the call stack hierarchy of the transaction may start with the parent function, which is called by the procedure call of elliptical arc 531. The function called by the procedure call of elliptical arc 532A/B is a child function of the parent function represented by arc 531. The function called by procedure call of elliptical arc 533A/B is a child function of the function represented by arc 532A/B, and the function called by the procedure call of elliptical arc 534A/B is a child function of the function represented by arc 533A/B.

In the example of FIG. 5, the elliptical arcs 530 are shown to be stacked on each other to illustrate the hierarchy of the call stack, where a second procedure call that is a child of a first procedure call has an elliptical arc contained within an elliptical arc of the first procedure call with respect to the horizontal axis 510. For example, elliptical arc 534A is contained within elliptical arc 533A to illustrate that the procedure call of arc 534A is a child called on by the procedure call of arc 533A. In the example illustrated in FIG. 5, the first set of elliptical arcs (left side of graph) are shown with semi-transparent shading to illustrate the position of the elliptical arcs 531, 532A, 533A, and 534A relative to each other.

Furthermore in some examples, different two-dimensional shapes representing procedure calls associated with different functions may be shown with different colors or shades. Relatedly, shapes representing procedure calls associated with the same function may be shown with the same colors or shades. This is illustrated in FIG. 5-8, in which procedure calls of different functions, such as those represented by elliptical arcs 532A and 533A, are shown with elliptical arcs having different shades of gray. On the other hand, procedure calls of the same function, such as those represented by elliptical arcs 532A and 532B, have elliptical arcs sharing the same shade of gray.

In some examples, a graphical representation of a transaction record may include an event indicator. The event indicator may be marked along a first axis of the graphical representation, where the event indicator indicates an occurrence of an event. As discussed previously, events may include exceptions, faults, anomalies, log entries, or user-defined events such as when a particular metric meets a threshold. As an example, an event may be triggered when computing resources hit a limit or when a bug is detected in the procedure.

Figure 6:
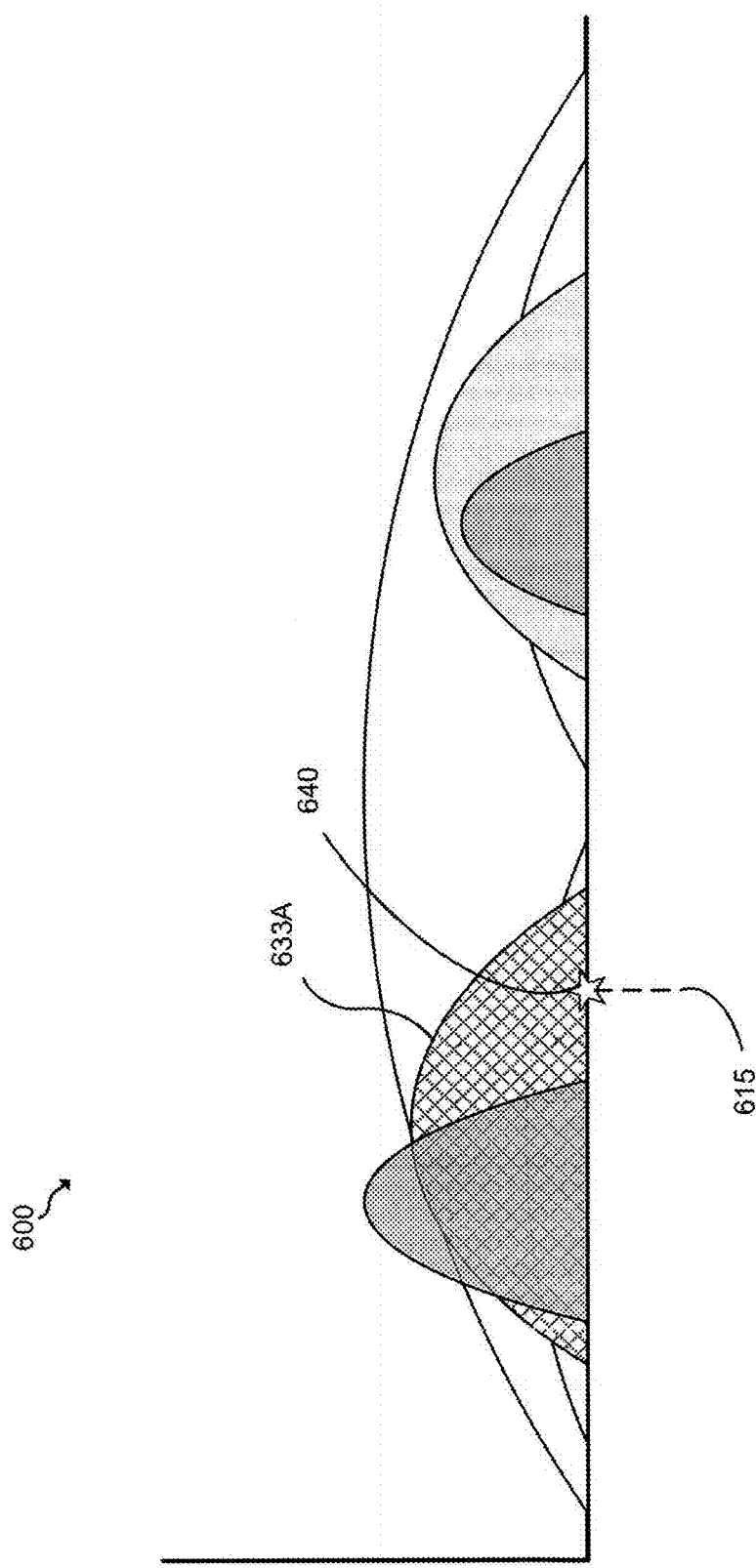
FIG. 6 is a schematic diagram depicting an example graphical representation for visualizations of computer program transactions.

An event indicator is illustrated in graphical representation 600 of FIG. 6 as event indicator 640. Event indicator 640 may indicate a location 615 on the horizontal axis where the event occurred. For instance, event indicator 640 indicates the time during the call-time of the transaction when the event occurred. Furthermore, as illustrated in FIG. 6, the event indicator 640 may indicate a particular procedure call of a plurality of procedure calls that caused the events. Event indicator shows the event occurring during the execution of the procedure call represented by elliptical arc 633A, which emphasized in FIG. 6 with the cross-shading.

Furthermore, in some examples, a graphical representation of a transaction record may include a log entry of the plurality of procedure calls. A log entry may be a record or list of activities, functions, results, or other data created as a result of the execution of the computer program transaction. In response to the selection, by a user, of a portion of a two-dimensional shape representing a portion of a particular procedure call, the graphical representation may show a portion of the log entry corresponding to the selected portion of the particular procedure call.

Figure 7:
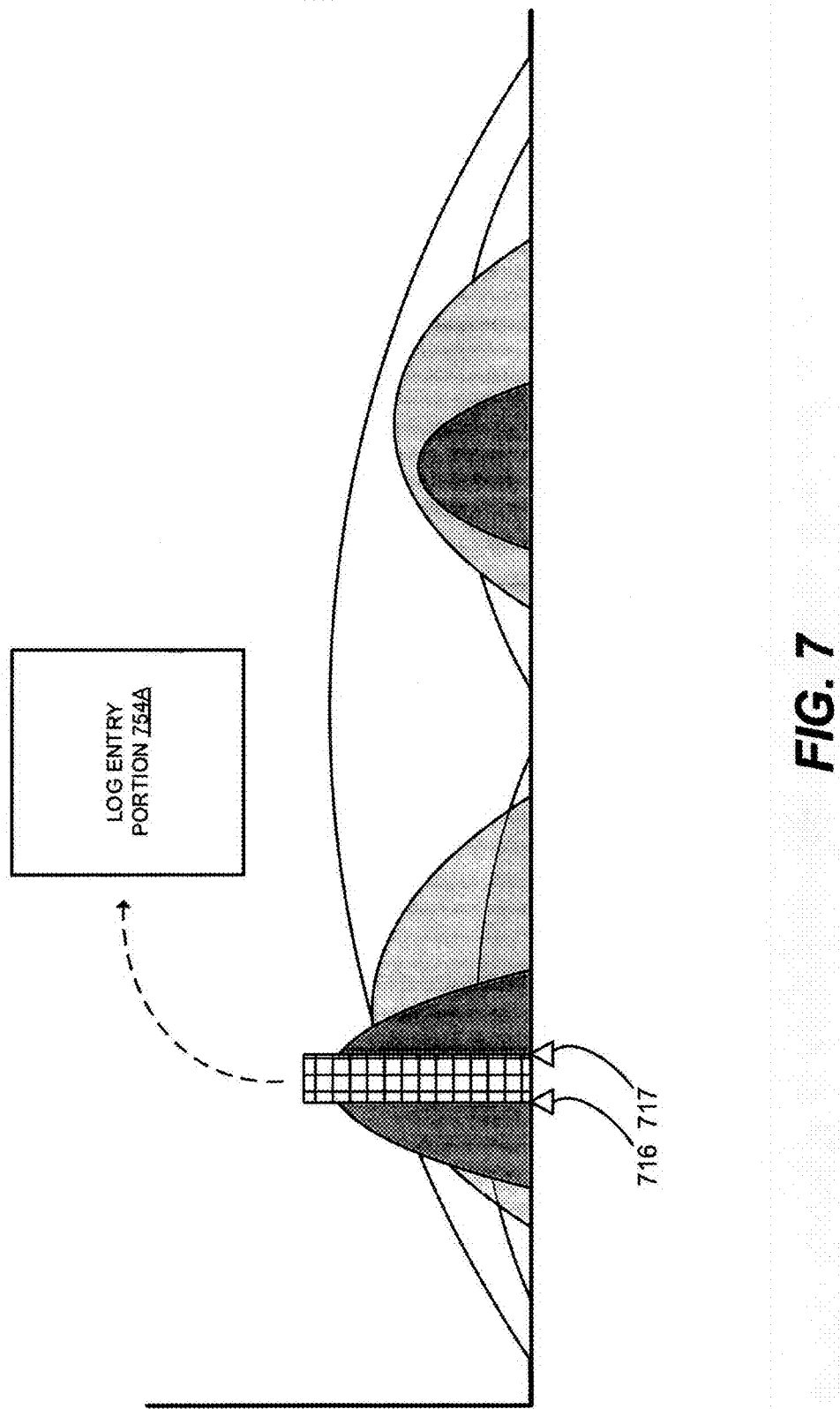
FIG. 7 is a schematic diagram depicting an example graphical representation for visualizations of computer program transactions.

This is illustrated with respect to graphical representation 700 of FIG. 7. In FIG. 7, a portion of an elliptical arc is selected, as illustrated as the portion of the arc between points 716 and 717. The hashed box shows the selected portion of the elliptical arc representing a particular procedure call of the transaction. As a result of the selection of the portion of the elliptical arc, log entry portion 754A is shown in the graphic representation 700. Changing the selected portion—that is moving the points 716 and 717 to different points along the horizontal axis—may cause a different log entry portion to be displayed.

Additionally or as an alternative, a graphical representation of a transaction record may, in some examples, include a graph overlaid on the plurality of two-dimensional shapes. The graph may represent a metric over time, and the graph and the plurality of two-dimensional shapes may correlate with respect to the first axis. The metric over time may include various examples, including, for example, processor performance over time, memory usage, and equipment temperature to name a few.

Figure 8:
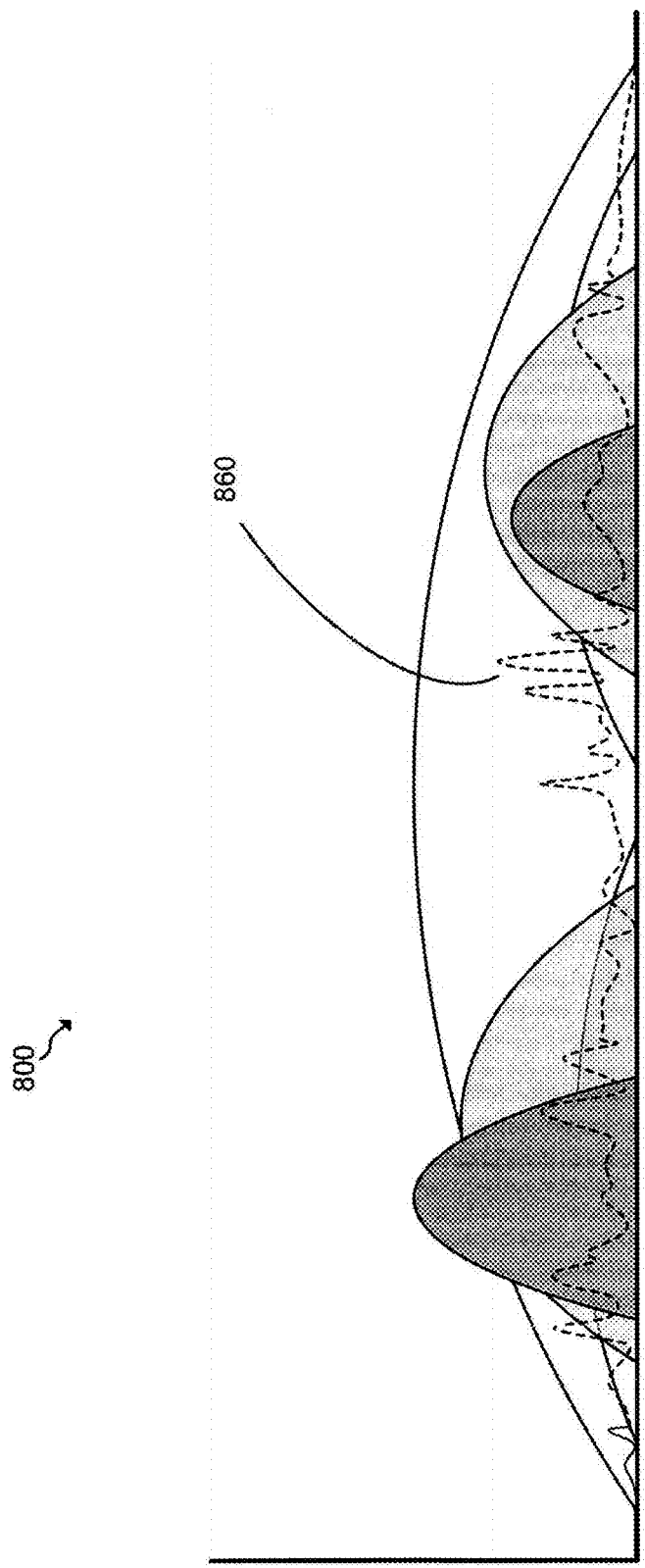
FIG. 8 is a schematic diagram depicting an example graphical representation for visualizations of computer program transactions.

This is illustrated with respect to graphical representation 800 of FIG. 8. In FIG. 8, a graph 860 is overlaid on top of a plurality of elliptical arcs representing the procedure calls of a program transaction. Graph 860 may indicate a metric over time that is correlated with the elliptical arcs representing the execution of the procedure calls. As an example, processor usage may be illustrated with respect to the call-time of the procedure calls. For example, graph 860 may show how parts of the transaction (and parts of the procedure calls) affect the processor performance.

In performing their respective functions, engines 121 and 122 may access data storage 129 and/or other suitable database(s). Data storage 129 may represent any memory accessible to computer program transaction visualizations system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Computer program transaction visualizations system 110 may access data storage 129 locally or remotely via network 50 or other networks.

Data storage 129 may include a database to organize and store data. Database 129 may be, include, or interface to, for example, relational database. Other databases, including file-based (e.g., comma or tab separated files), or query formats, platforms, or resources such as OLAP (On Line Analytical Processing), SQL (Structured Query Language), a SAN (storage area network), or others may also be used, incorporated, or accessed. The database may reside in a single or multiple physical device(s) and in a single or multiple physical location(s). The database may store a plurality of types of data and/or files and associated data or file description, administrative information, or any other data.

Figure 2:
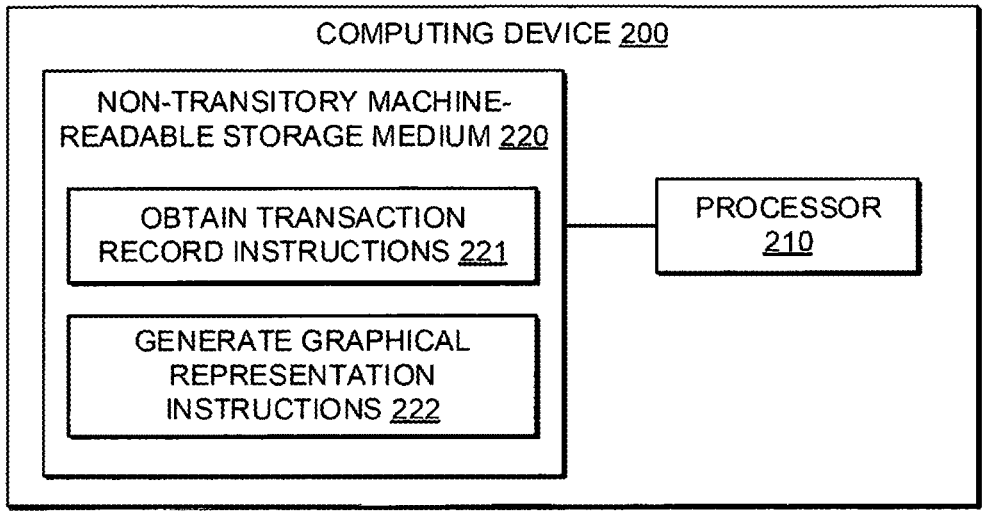
FIG. 2 is a block diagram depicting an example computing device for providing visualizations of computer program transactions.

FIG. 2 block diagram depicting an example computing device 200 for providing visualizations of computer program transactions. Computing device 200 may include a server, cloud-based server, laptop computing device, a desktop computing device, an all-in-one computing device, a tablet computing device, a mobile phone, an electronic book reader, a network-enabled appliance such as a "Smart" television, and/or other electronic device suitable for the functions described herein.

In the foregoing discussion, engines 121 and 122 were described as combinations of hardware and programming. Engines 121 and 122 may be implemented in a number of fashions. Referring to FIG. 2, the programming may be processor executable instructions 221 and 222 stored on a machine-readable storage medium 220 and the hardware may include a processor 210 for executing those instructions. Thus, machine-readable storage medium 220 can be said to store program instructions or code that when executed by processor 210 implements computer program transaction visualizations system 110 of FIG. 1.

In FIG. 2, the executable program instructions in machine-readable storage medium 220 are depicted as obtain transaction record instructions 221 and generate graphical representation instructions 222. Instructions 221 and 222 represent program instructions that, when executed, cause processor 210 to implement engines 121 and 122, respectively.

Processor 210 may be at least one central processing unit (CPU), microprocessor, and/or other hardware device suitable for retrieval and execution of instructions stored in machine-readable storage medium 220. Processor 210 may fetch, decode, and execute program instructions 221, 222, and/or other instructions. As an alternative or in addition to retrieving and executing instructions, processor 210 may include at least one electronic circuit comprising a number of electronic components for performing the functionality of at least one of instructions 221, 222, and/or other instructions.

Machine-readable storage medium 220 may be any electronic, magnetic, optical, or other physical storage device that contains or stores executable instructions. In some implementations, machine-readable storage medium 220 may be a non-transitory storage medium, where the term "non-transitory" does not encompass transitory propagating signals. Machine-readable storage medium 220 may be implemented in a single device or distributed across devices. Likewise, processor 210 may represent any number of processors capable of executing instructions stored by machine-readable storage medium 220. Processor 210 may be integrated in a single device or distributed across devices. Further, machine-readable storage medium 220 may be fully or partially integrated in the same device as processor 210, or it may be separate but accessible to that device and processor 210.

In one example, the program instructions may be part of an installation package that when installed can be executed by processor 210 to implement computer program transaction visualizations system 110. In this case, machine-readable storage medium 220 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 220 may include a hard disk, optical disk, tapes, solid state drives, RAM, ROM, EEPROM, or the like.

Figure 3:
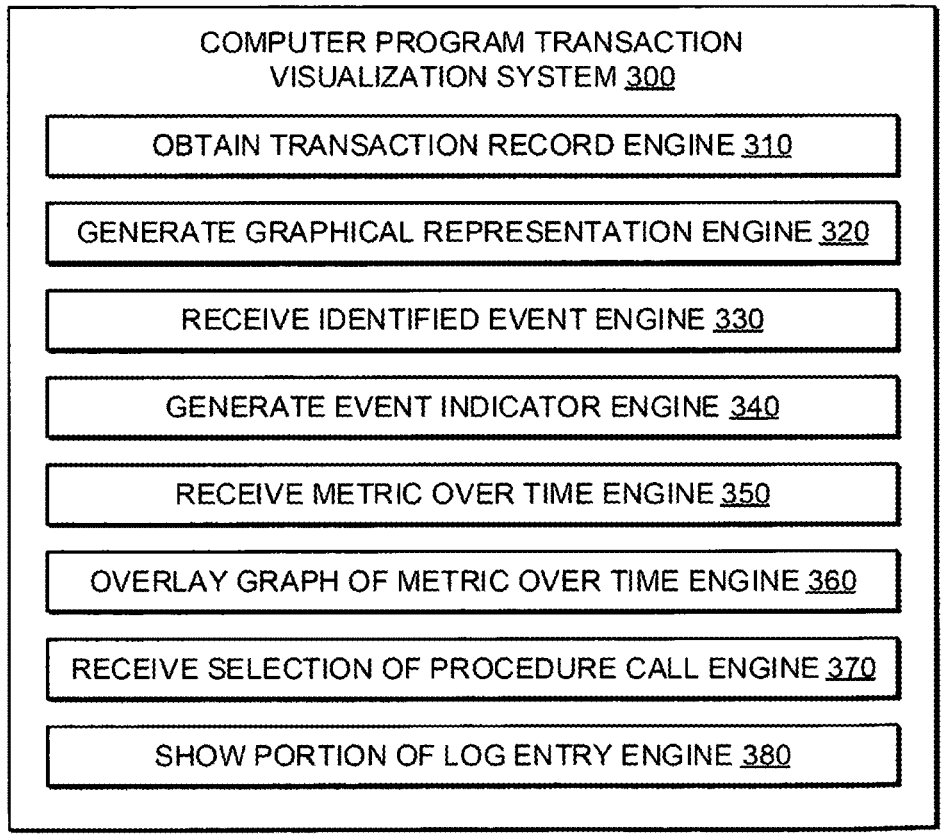
FIG. 3 is a block diagram depicting an example computer program transaction visualizations system.

FIG. 3 is a block diagram depicting an example computer program transaction visualizations system 300. System 300 may have a obtain transaction record engine 310, generate graphical representation engine 320, receive identified event engine 330, generate event indicator engine 340, receive metric over time engine 350, overlay graph of metric over time engine 360, receive selection of procedure call engine 370, and show portion of log entry engine 380. Engine 310 may represent obtain transaction record engine 121, while the functionalities of engines 320-380 may be represented by graphical representation engine 122.

Figure 4:
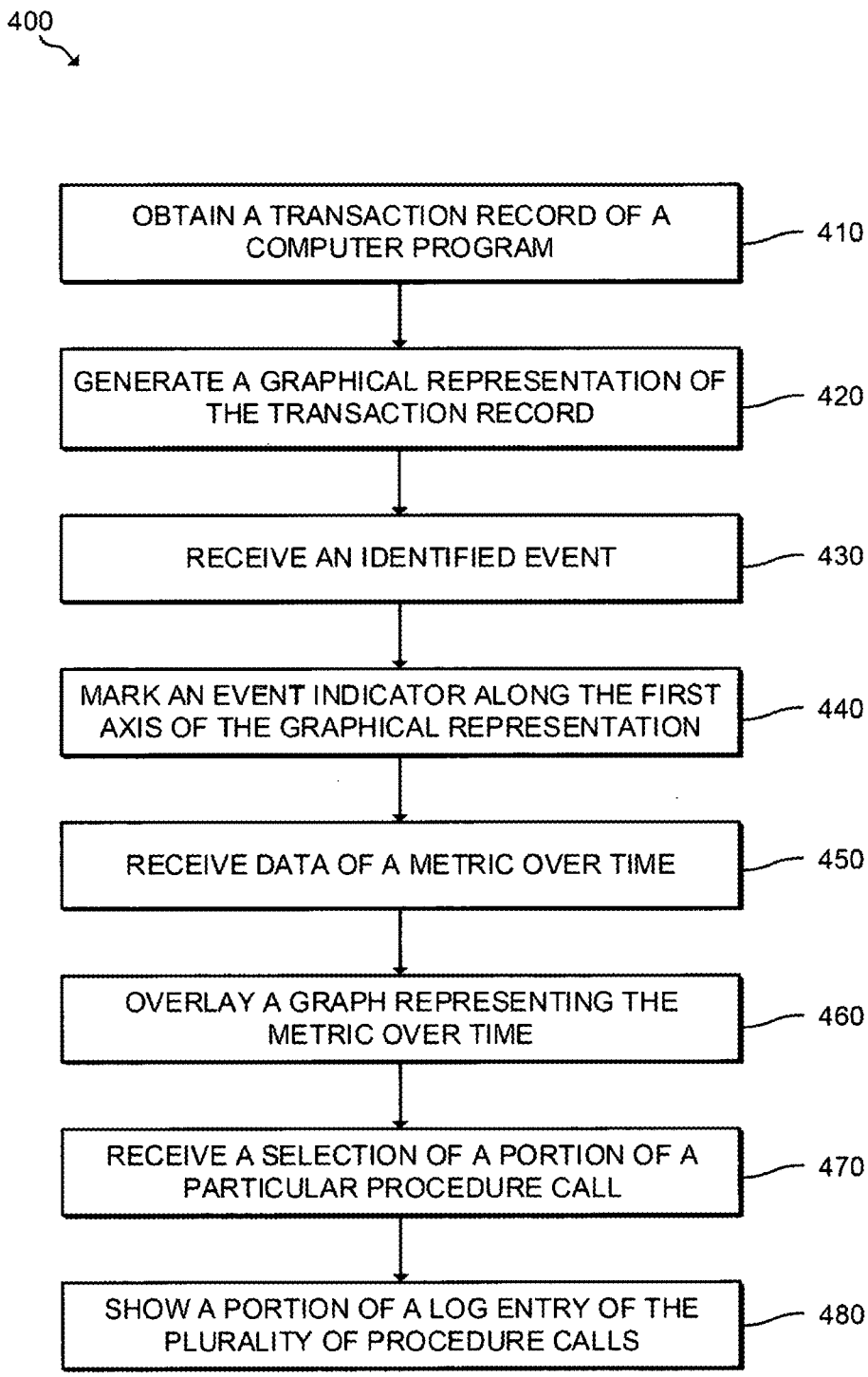
FIG. 4 is a flow diagram depicting an example method for visualizations of computer program transactions.

FIG. 4 is a flow diagram depicting an example method 400 for visualizations of computer program transactions. The various processing blocks and/or data flows depicted in FIG. 4 are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 400 as illustrated (and described in greater detail below) is meant be an example and, as such, should not be viewed as limiting. Method 400 may be implemented in the form of executable instructions stored on a machine-readable storage medium, such as storage medium 220, and/or in the form of electronic circuitry.

In an operation 410, method 400 may include obtaining a transaction record of a computer program. As explained in examples herein, a transaction record may include a call stack of a plurality of procedure calls, a self-time of each procedure call of the plurality of procedure calls, and an event indicator indicating the occurrence of an event. Referring to FIG. 3, obtain transaction record 310 may be responsible for implementing operation 410.

In an operation 420, method 400 may include generating a graphical representation of the transaction record. A graphical representation of the transaction record may, among other things, include a plurality of two-dimensional shapes, such as elliptical arcs, that represent a plurality of procedure calls of a program transaction, and call-times and self-times of the procedure calls. Referring to FIG. 3, generate graphical representation engine 320 may be responsible for implementing operation 420.

In an operation 430, method 400 may include receiving an identified event. A event may include exceptions, faults, anomalies, log entries, or user-defined events such as when a particular metric meets a threshold. As an example, an event may be triggered when computing resources hit a limit or when a bug is detected in the procedure. Referring to FIG. 3, receive identified event engine 330 may be responsible for implementing operation 430.

In an operation 440, method 400 may include marking an event indicator along the first axis of the graphical representation. An event indicator may be marked along a first axis to indicate an occurrence of an event. For instance, an event indicator may indicate when during the call-time of a transaction that an event occurred. Furthermore, an event indicator may indicate a particular procedure call of a plurality of procedure calls that caused the events. Referring to FIG. 3, generate event indicator engine 340 may be responsible for implementing operation 440.

In an operation 450, method 400 may include receiving data of a metric over time. The metric over time may include various examples, including, for example, processor performance over time, memory usage, and equipment temperature to name a few. Referring to FIG. 3, receive metric over time engine 350 may be responsible for implementing operation 450.

In an operation 460, method 400 may include overlaying a graph representing the metric over time on the plurality of two-dimensional shapes. The graph may indicate a metric over time that is correlated with the shapes representing the execution of procedure calls. Referring to FIG. 3, overlay graph of metric over time engine 360 may be responsible for implementing operation 460.

In an operation 470, method 400 may include receiving a selection of a portion of a particular procedure call of a plurality procedure calls. For example, a user, may select a portion of a two-dimensional shape representing a portion of a particular procedure call to view detailed information about the selected portion. Referring to FIG. 3, receive selection of procedure call engine 370 may be responsible for implementing operation 470.

In an operation 480, method 400 may include showing a portion of a log entry of the plurality of procedure calls. For example, a portion of the log entry may be shown that correlates to the selected portion of the particular procedure calls received in operation 470. Referring to FIG. 3, show portion of log entry engine 380 may be responsible for implementing operation 470.

Furthermore, referring back to FIG. 1, obtain transaction record engine 121 may be responsible for implementing operation 410. Graphical representation engine 122 may be responsible for implementing operations 420-480.

FIG. 5 is a diagram depicting an example graphical representation 500 for visualizations of computer program transactions. FIG. 6 is a diagram depicting an example graphical representation 600 for visualizations of computer program transactions. FIG. 7 is a diagram depicting an example graphical representation 700 for visualizations of computer program transactions. FIG. 8 is a diagram depicting an example graphical representation 800 for visualizations of computer program transactions. Graphical representation 500 (and other graphical representation described herein) may be used to cause various actions to be performed by computer program transactions visualizations system 110.

FIGS. 5-8 are discussed herein with respect to FIG. 1.

The foregoing disclosure describes a number of example embodiments for generating recommended inputs for changing an outcome of a predictive model. The disclosed examples may include systems, devices, computer-readable storage media, and methods for generating recommended inputs. For purposes of explanation, certain examples are described with reference to the components illustrated in FIGS. 1-5. The functionality of the illustrated components may overlap, however, and may be present in a fewer or greater number of elements and components. All or part of the functionality of illustrated elements may co-exist or be distributed among several geographically dispersed locations. Moreover, the disclosed examples may be implemented in various environments and are not limited to the illustrated implementations.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

What is claimed is:

1. A method, comprising:
   obtaining, using an obtain transaction record engine executed by a physical processor of a computing device executing machine readable instructions, a transaction record of a computer program, the transaction record comprising a call stack of a plurality of procedure calls and a call-time and a self-time of each procedure call of the plurality of procedure calls, wherein each self-time is a duration during which a corresponding procedure call has been called for execution by the physical processor but has not completed execution, and wherein there are not any child procedures branched from the procedure calls on the call stack that have executed;
   generating, using a graphical representation engine executed by the physical processor executing the machine readable instructions, a graphical representation of the transaction record, the graphical representation comprising a plurality of two-dimensional shapes aligned with a first axis and a second axis, wherein:
      each two-dimensional shape represents a procedure call of the plurality of procedure calls;
      a first dimension of each two-dimensional shape of the plurality of two-dimensional shapes represents the call-time of each procedure call from the transaction record represented by the plurality of two-dimensional shapes;
      a second dimension of each two-dimensional shape represents the self-time of each procedure call from the transaction record represented by the plurality of two-dimensional shapes; and
      the plurality of two-dimensional shapes are positioned within the graphical representation according to respective relative positions of each procedure call within the call stack; and
   displaying, on a user interface of the computing device, the graphical representation of the transaction record, and, at a time when an event is triggered, an indicator of the event at a particular point in one call-time of one of the procedure calls, wherein the indicator of the event is marked along the first axis and indicates the procedure call of the plurality of procedure calls that triggered the event.

2. The method of claim 1, wherein each of the plurality of two-dimensional shapes is an elliptical arc, wherein a flat edge of each elliptical arc is aligned with the first axis, and wherein a relative height of each elliptical arc represents a relative self-time of each procedure call.

3. The method of claim 1, wherein a second two-dimensional shape representing a second procedure call is contained within a first two-dimensional shape representing a first procedure call with respect to the first axis, wherein the second procedure call is a child of the first procedure call on the call stack.

4. The method of claim 1, wherein the graphical representation of the transaction record further comprises a graph overlaid on the plurality of two-dimensional shapes, wherein the graph represents a metric over time, and wherein the graph and the plurality of two-dimensional shapes are correlated with respect to the first axis.

5. The method of claim 1, wherein the graphical representation of the transaction record further comprises a log entry of the plurality of procedure calls, and the method further comprising:
displaying a portion of the log entry in response to a selection of a portion of a two-dimensional shape representing a portion of a particular procedure call, wherein the portion of the log entry corresponds to the portion of the particular procedure call.

6. The method of claim 1, wherein a first two-dimensional shape and a second two-dimensional shape respectively representing a first procedure call and a second procedure call of the plurality of procedural calls are of a same color when the first procedure call and the second procedure call are associated with a same function.

7. A non-transitory machine-readable storage medium comprising instructions executed by a processor of a computing device, the machine-readable storage medium comprising instructions to:
obtain a transaction record of a computer program, the transaction record comprising a call stack of a plurality of procedure calls and a call-time and a self-time of each procedure call, wherein each self-time is a duration during which a corresponding procedure call has been called for execution by the processor but has not completed execution, and wherein there are not any child procedures branched from the procedure calls on the call stack that have executed;
generate a graphical representation of the transaction record, the graphical representation comprising a plurality of elliptical arcs, each elliptical arc representing a procedure call of the plurality of procedure calls, wherein:
a flat edge of each elliptical arc is aligned with a first axis;
the flat edge of each elliptical arc represents the call-time of each procedure call from the transaction record represented by the elliptical arcs;
a relative height of each elliptical arc with respect to a second axis represents the self-time of each procedure call from the transaction record represented by the elliptical arcs; and
the plurality of elliptical arcs are positioned within the graphical representation of the transaction record according to respective relative positions of each procedure call within the call stack; and
display, on a user interface of the computing device, the graphical representation of the transaction record, and at a time when an event is triggered, an indicator of the event at a particular point in one call-time of one of the procedure calls, wherein the indicator of the event is marked along the first axis and indicates the procedure call of the plurality of procedure calls that triggered the event.

8. The storage medium of claim 7, wherein a second elliptical arc representing a second procedure call is contained within a first elliptical arc representing a first procedure call with respect to the first axis, wherein the second procedure call is a child of the first procedure call on the call stack.

9. The storage medium of claim 7, the graphical representation of the transaction record further comprising a graph overlaid on the plurality of elliptical arcs, wherein the graph represents a metric over time, and wherein the graph and the plurality of elliptical arcs are correlated with respect to the first axis.

10. A computing device comprising:
a physical processor;
an obtain transaction record engine, executed by the physical processor, to obtain a transaction record of a computer program, the transaction record comprising a call stack of a plurality of procedure calls and a call-time and a self-time of each procedure call, wherein each self-time is a duration during which a corresponding procedure call has been called for execution by the physical processor but has not completed execution, and wherein there are not any child procedures branched from the procedure calls on the call stack that have executed;
a graphical representation engine, executed by the physical processor, to generate a graphical representation of the transaction record, the graphical representation comprising a plurality of elliptical arcs, each elliptical arc representing a procedure call of the plurality of procedure calls, wherein:
a flat edge of each elliptical arc is aligned with a first axis;
the flat edge of each elliptical arc represents the call-time of each procedure call from the transaction record represented by the elliptical arcs;
a relative height of each elliptical arc with respect to a second axis represents the self-time of each procedure call from the transaction record represented by the elliptical arcs; and
the plurality of elliptical arcs are positioned within the graphical representation of the transaction record according to respective relative positions of each procedure call within the call stack such that a second elliptical arc representing a second procedure call is contained within a first elliptical arc representing a first procedure call with respect to the first axis, wherein the second procedure call is a child of the first procedure call on the call stack; and
a user interface to display, the graphical representation of the transaction record, and at a time when an event is triggered, an indicator of the event at a particular point in one call-time of one of the procedure calls, wherein the indicator of the event is marked along the first axis and indicates the procedure call of the plurality of procedure calls that triggered the event.

11. The computing device of claim 10, further comprising the graphical representation engine to display a portion of a log entry of the plurality of procedure calls in response to a selection of a portion of an elliptical arc representing a portion of a particular procedure call, wherein the portion of the log entry corresponds to the portion of the particular procedure call.

* * * * *